BRACKEBUSH & MERRIFIELD.
Harvester.

2 Sheets—Sheet 1.

No. 94,865.

Patented Sept. 14, 1869.

BRACKEBUSH & MERRIFIELD.
Harvester.
No. 94,865.
2 Sheets—Sheet 2.
Patented Sept. 14, 1869.
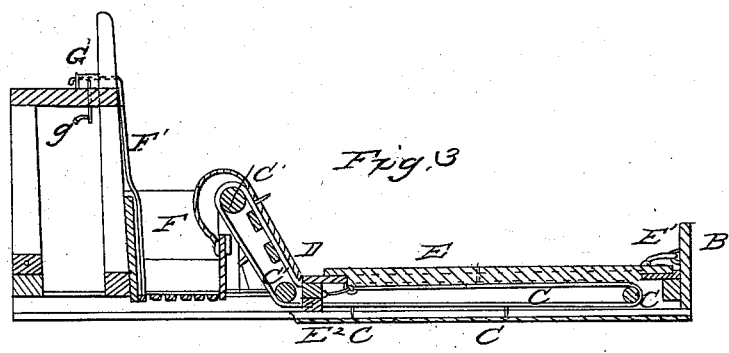
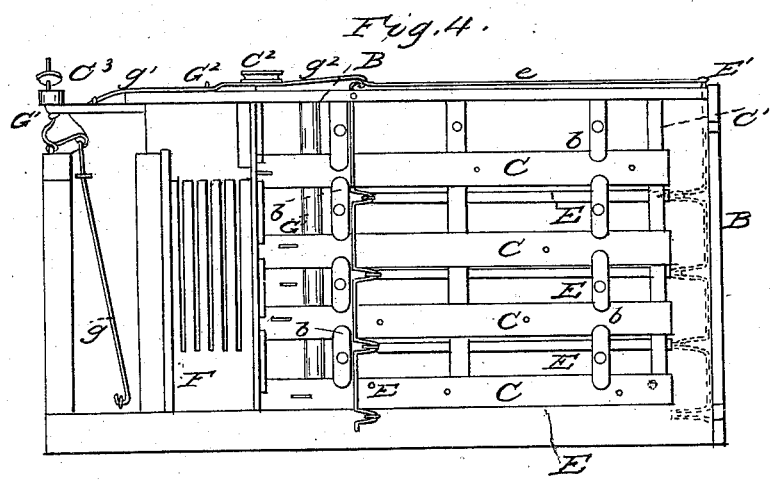

UNITED STATES PATENT OFFICE.

C. J. BRACKEBUSH AND C. E. MERRIFIELD, OF INDIANAPOLIS, INDIANA.

IMPROVEMENT IN HARVESTERS.

Specification forming part of Letters Patent No. 94,865, dated September 14, 1869.

*To all whom it may concern:*

Be it known that we, C. J. BRACKEBUSH and C. E. MERRIFIELD, both of Indianapolis, in the county of Marion and State of Indiana, have invented a new and useful Improvement in Harvesters; and we do hereby declare that the following is a full, clear, and exact description thereof, reference being had to the annexed drawings, making part of this specification, in which—

Figure 1:
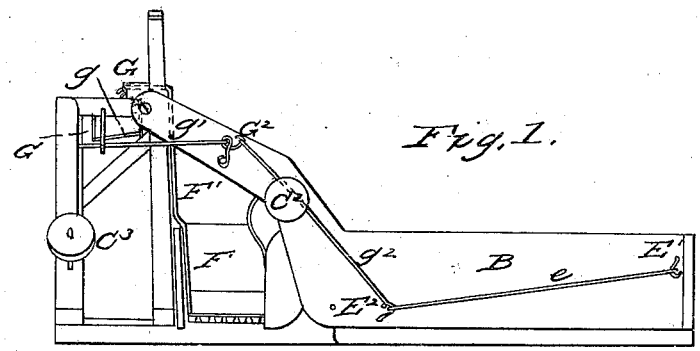
Figure 2:
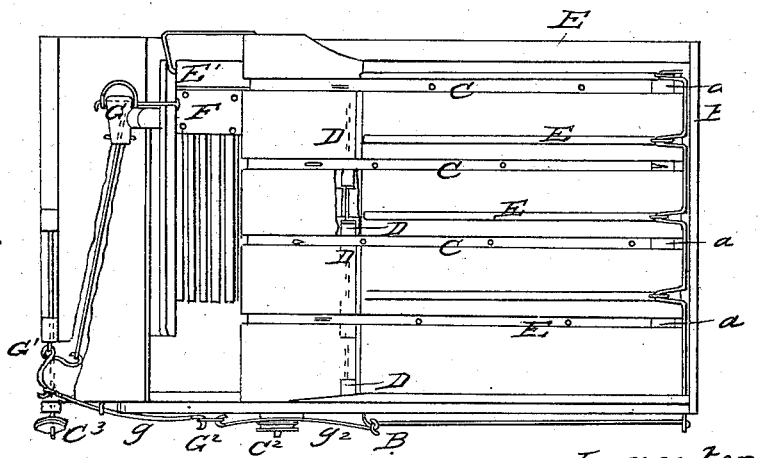

Figure 1 is a rear elevation of such a portion of a harvester as will illustrate our improvements. Fig. 2 is a plan or top view of the same. Fig. 3 is a sectional elevation of the same, and Fig. 4 is a bottom view thereof.

Corresponding letters refer to corresponding parts in the several figures.

Our invention relates to harvesters; and its object is to provide means by which the machine shall automatically carry the grain from the grain-receptacle sidewise over an inclined side thereof and deliver it into a box, from which it is to be discharged from time to time by the operator, whereby it is put out of the way of the horses and the machine in cutting the succeeding swath.

Our improvements consist in the combination and arrangement of the parts by which this result is accomplished.

To enable those skilled in the art to make and use our invention, we will proceed to describe its construction and operation.

A in the drawings represents the platform, upon which the grain falls after it has been cut. It is to be secured to a suitable framework in rear of the cutter-bar, and is provided with a series of transverse slots, *a a*, through which the teeth of the endless belts project, and another series of slots, one in front of each belt, in the horizontal portion of the said platform, for the reception of a series of bars, which are about flush with the surface of the platform when at rest, but may be raised simultaneously to prevent the grain from being removed by the toothed belts. The side of the platform next to the driving portion of the machine is turned up at an angle, and then again turned down to be secured to the side of the grain-box, as shown in Fig. 3 of the drawings.

B represents the frame, which, in this instance, is to be constructed so as to adapt it for the reception and to assist in the proper working of some of the parts which are to be attached to it. It is constructed with several longitudinal bars, to which the platform is secured, and which are, on their upper sides, provided with notches to serve as guides for the belts and the series of bars constituting a false platform. To the under side of these bars a number of buttons, *b*, are secured, serving as guides for the belts on this side, as clearly shown in Fig. 4. The under side of the frame is to be closed by boards or sheet metal, to protect the working parts under the platform.

C C represent a series of endless belts, provided at suitable intervals with outwardly-projecting teeth *c*, said belts being so arranged with reference to the horizontal and inclined portions of the platform that as they are moved their teeth shall carry the cut grain over the inclined portion, and, then receding from it, allow it to fall into the grain-box. The belts are arranged on shafts or rollers $C^1$, which have their bearings in the frame. The journals of the uppermost roller are placed in sliding bearings, by means of which the belts can be kept at the required tension, and that one of its journals which is arranged in the rear end of the frame projects through it a sufficient distance to receive upon it a sheave, $C^2$, which is to be driven by a belt or rope receiving its motion from the driving-sheave $C^3$.

D represents rollers, which are arranged in pairs on shafts secured to the platform at the point where it is turned up, one set between each pair of slots *a* therein, and in such a manner that they shall bear down upon the upper face of the belts on each side of their teeth, giving to them the proper direction.

E E represent a series of bars set into slots in the platform, and serving as a movable or false platform, which is operated by means of two cranked shafts, $E^1$ and $E^2$, the cranked portions of which are attached to the ends of the several bars by staples, or in any other convenient manner. These shafts have their bearings in the frame, the one designated $E^2$ being arranged under the platform so as to offer no obstruction, while the other one, $E^1$, may be placed above the platform, as shown in Fig. 3. Both are to extend a short distance through the rear end of the frame, where they are again cranked, and then connected together by the connecting-rod $e$, the position of these cranks with reference to each other being such that, as they are turned in one direction or the other, they shall raise or lower the movable platform.

F represents the grain-box, the rear end of which is to be left open. It is to be secured between the frame B and the driving portion of the harvester, and can be made of any required dimensions. Its bottom, being movable, is to be pivoted or hinged to the front end, and near this part a lever or bar, F', is attached to it, which is carried upward and connected to the lever G, by which it can be operated so as to raise or lower the bottom. G represents the lever just spoken of. In this instance I have shown an angled foot-lever, the end of its horizontal portion being pivoted on the foot-board in front of the driver's seat, while its vertical portion extends downward. Where the vertical portion diverges from the horizontal portion the bar F', for operating the bottom of the grain-box, is to be attached. Connecting-rod $g$ connects the end of the vertical portion of this lever to the bell-crank lever $G^1$, which turns on a stud secured to the frame-work of the machine, its other end being connected by rod $g^1$ to another lever, $G^2$, which is pivoted to the rear end of the frame B. This lever $G^2$ is connected by rod $g^2$ to the cranked shaft $E^2$.

By the above-described arrangement of mechanism the bottom of the grain-box F and the false platform E are operated simultaneously by depressing or raising the foot-lever G, it being such that, as the bottom of the grain-box is lowered for the purpose of discharging the grain, the false platform is raised to prevent the grain which is being cut while discharging the grain-box from being removed. As soon as the box is emptied its bottom is again raised, by which movement the false platform is lowered, bringing the grain within the influence of the toothed endless belts, by which it is delivered into the grain-box until enough has accumulated to form a sheaf, when it is again discharged, and thus the operation is continued.

Having thus described our invention, what we claim, and desire to secure by Letters Patent, is—

1. In a harvester, the combination of the platform A, toothed endless belts C, false platform E, and grain-box F, when arranged to operate substantially as and for the purpose set forth.

2. The mechanism herein described for simultaneously operating the bottom of the grain-box and the false platform, substantially as and for the purpose set forth.

In testimony whereof we have signed our names to this specification in the presence of two subscribing witnesses.

C. J. BRACKEBUSH.
C. E. MERRIFIELD.

Witnesses:
J. H. McKEMAN,
A. M. CARNAHAN.